US009013591B2

(12) United States Patent
Jain et al.

(10) Patent No.: US 9,013,591 B2
(45) Date of Patent: Apr. 21, 2015

(54) METHOD AND SYSTEM OF DETERMING USER ENGAGEMENT AND SENTIMENT WITH LEARNED MODELS AND USER-FACING CAMERA IMAGES

(71) Applicants: Aakash Jain, Santa Clara, CA (US); Abhilekh Argawal, Santa Clara, CA (US); Saurav Kumar, Santa Clara, CA (US)

(72) Inventors: Aakash Jain, Santa Clara, CA (US); Abhilekh Argawal, Santa Clara, CA (US); Saurav Kumar, Santa Clara, CA (US)

( * ) Notice: Subject to any disclaimer, the term of this patent is extended or adjusted under 35 U.S.C. 154(b) by 50 days.

(21) Appl. No.: 13/895,311

(22) Filed: May 15, 2013

(65) Prior Publication Data

US 2014/0340531 A1   Nov. 20, 2014

(51) Int. Cl.
*H04N 5/235* (2006.01)
*H04N 5/262* (2006.01)
*H04N 5/225* (2006.01)
*H04N 5/232* (2006.01)

(52) U.S. Cl.
CPC ................. *H04N 5/23222* (2013.01)

(58) Field of Classification Search
CPC .................................... H04N 5/23219
USPC ....................... 348/222.1, 239, 169
See application file for complete search history.

(56) References Cited

U.S. PATENT DOCUMENTS

2007/0195174 A1 *   8/2007   Oren ................... 348/222.1

* cited by examiner

*Primary Examiner* — Joel Fosselman

(57) ABSTRACT

In one exemplary embodiment, a method includes the step of obtaining a digital image of a user with a user-facing camera of a computing device. It is determined that the digital image includes a frontal image of the user. A user-sentiment score is calculated based on at least one attribute of the frontal image. A user engagement value is determined with respect to a portion of a display of the computing device. At least one of the frontal image of the user, the user-sentiment score or the gaze position of the user is communicated to an external server process or an application operating in the computing device.

10 Claims, 12 Drawing Sheets

METHOD AND SYSTEM OF DETERMINING USER ENGAGEMENT AND SENTIMENT WITH LEARNED MODELS AND USER-FACING CAMERA IMAGES

CROSS-REFERENCE TO RELATED APPLICATIONS

This application claims the benefit of U.S. Provisional Application No. 61/648,480, and titled 'Mobile application that uses the front camera to report user engagement, sentiment, gaze and emotion with content'. This application claims the benefit of U.S. Provisional Application No. 61/779,219, and titled 'Apparatus for Adaptive Calibration Free Gaze Estimation for Smart Devices'. This application claims the benefit of U.S. Provisional Application No. 61/781,919, and titled 'Apparatus for Natural Human Interaction with Devices'. This application claims the benefit of U.S. Provisional Application No. 61/802,047, and titled 'Apparatus for Measuring Human Attention'. This application claims the benefit of U.S. Provisional Application No. 61/801,051, and titled 'Novel Method to Make Devices Aware of Human Presence'. These provisional applications are incorporated herein by reference.

BACKGROUND

1. Field

This application relates generally to human-computer interfaces, and more specifically to a system, article of manufacture and method for determining user engagement and sentiment with learned models and user-facing camera images.

2. Related Art

Currently, user engaging with digital media content can be determined through such metrics as 'click through' rate, number of uploads, amount of time an advertisement was allowed to completely run, etc. However these metrics can be deficient with respect to determining whether the user actually paid attention (e.g., did the user even view the digital media content, how did the user react and where did they mostly focus while watching the content?) Moreover, current methods can use external eye-tracking hardware. This can limit the benefits of eye tracking to particular users with access to the external eye-tracking hardware. Consequently, improvements are sought that can determine user engagement and sentiment with learned models and user-facing camera images

BRIEF SUMMARY OF THE INVENTION

In one aspect, a method includes the step of obtaining a digital image of a user with a user-facing camera of a computing device. It is determined that the digital image includes a frontal image of the user. A user-sentiment score is calculated based on at least one attribute of the frontal image. A user engagement value is determined with respect to a portion of a display of the computing device. At least one of the frontal image of the user, the user-sentiment score or the gaze position of the user is communicated to an external server process or an application operating in the computing device.

Optionally, the computing device comprises a tablet computer. The step of determining that the digital image comprises a frontal image of the user can include: receiving a frontal-image learned model and comparing the digital image with the frontal-image learned model. The step of determining that the digital image comprises a frontal image of the user can include: determining a sufficient similarity between the digital image and the frontal-image learned model: receiving a set of learned-smile models, wherein each learned-smile model is associated with a specified user-sentiment score; and extracting a user-smile attribute from the frontal-image. The step of calculating a user-sentiment score based on at least one attribute of the frontal image can include: comparing the user-smile attribute with the set of learned-smile models; determining a best-fit learned-smile model of the set of learned-smile models for the user-smile attribute; and assigning the user sentiment score the specified user-sentiment score of the best-fit learned-smile model. The step of determining a user engagement value with respect to a portion of a display of the computing device can include: mapping a gaze position of the user with respect to a location of the display of the computing device; detecting that a subsequent digital image comprises a profile image of the user after a previous digital image comprises the frontal image of the user; and using the detection of the subsequent digital image comprises the profile image of the user after the previous digital image composes the frontal image of the user as a form of human-computer interaction. The form of human-computer interaction can include pausing a play process of a digital video.

BRIEF DESCRIPTION OF THE DRAWINGS

The present application can be best understood by reference to the following description taken in conjunction with the accompanying figures, in which like parts may be referred to by like numerals.

Figure 1:
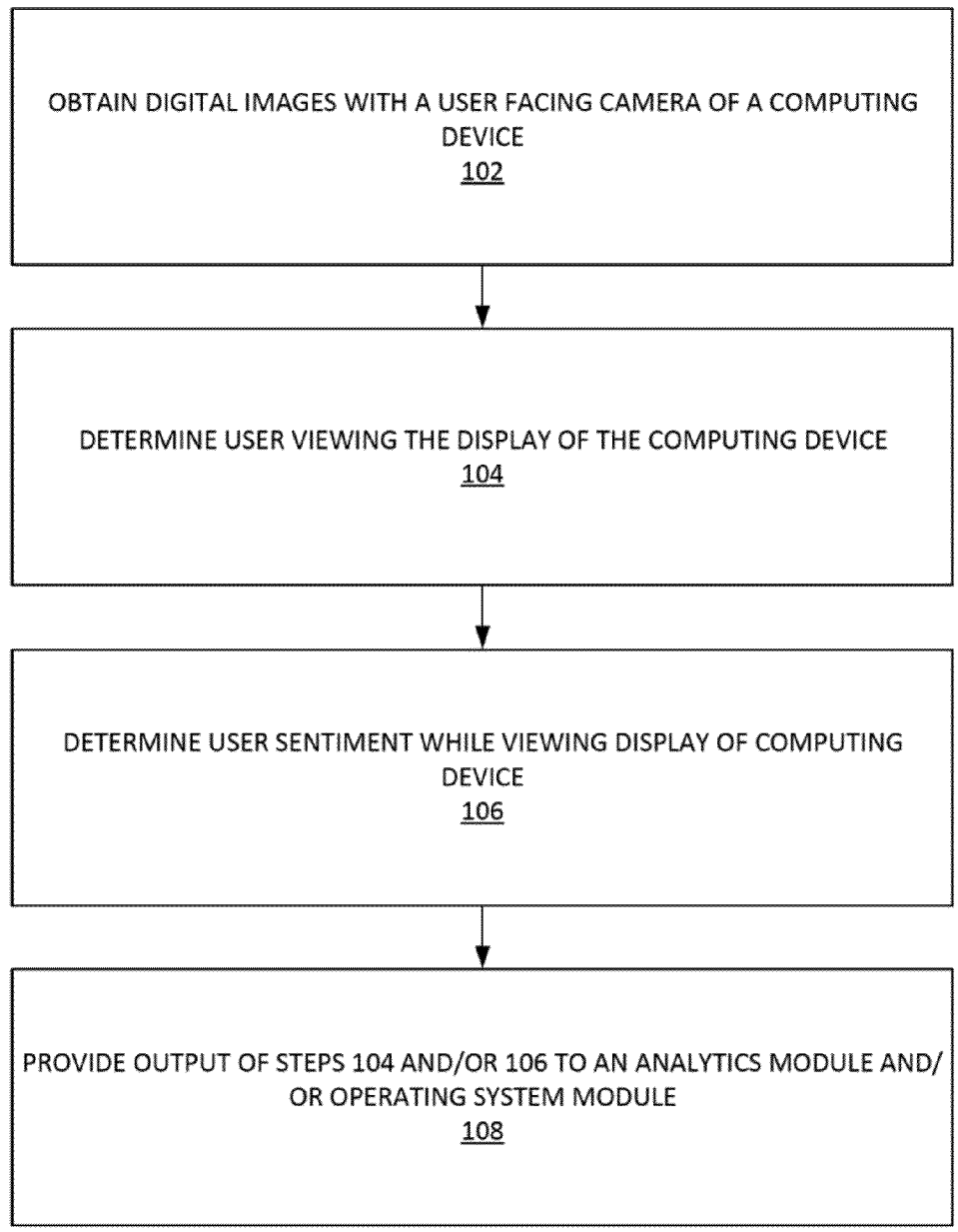
FIG. 1 depicts an example process for determining user engagement and sentiment with learned models and user-facing camera images, according to some embodiments.

The Figures described above are a representative set, and are not an exhaustive with respect to embodying the invention.

DETAILED DESCRIPTION

Disclosed are a system, method, and article of manufacture for determining user engagement and sentiment with learned models and user-facing camera images. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and fine types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Processes

FIG. 1 depicts an example process 100 for determining user engagement and sentiment with learned models and user-facing camera images, according to some embodiments. In step 102 of process 100, digital images are obtained with a user-facing digital camera of a computing device. In step 104, the digital images are analyzed to determine if a user is viewing a display of the computing device. For example, computer-vision algorithms can be utilized to detect a frontal-view of a user's face (e.g. a frontal-image). If a frontal-view of a user's face is detected, then various attributes of the user's face can be obtained/tracked. For example, the user's gaze can be tracked with respect to locations on the display. The user's gaze can be mapped with displayed content. In this way, for example, it can be determined that a user is engaged with a particular digital video and/or digital image. In step 106, a user's sentiment can be determined while the user is viewing the display. For example, the digital image(s) of the user can be parsed and blocks of the image that include smile attributes can be extracted. The user's smile attributes can be scored (e.g. based on smile characteristics when compared with a set of smile models). Smile scores can be aggregated with other sentiment indicators extracted from the digital image. In this way, a user's sentiment while viewing the display can be scored as well. In step 108, the output of steps 104 and/or 106 can be provided to an analytics module (e.g. in the computing, device and/or in a remote server) and/or an appropriate operating system module (e.g. in order to initiate various operating system functionalities).

Figure 2:
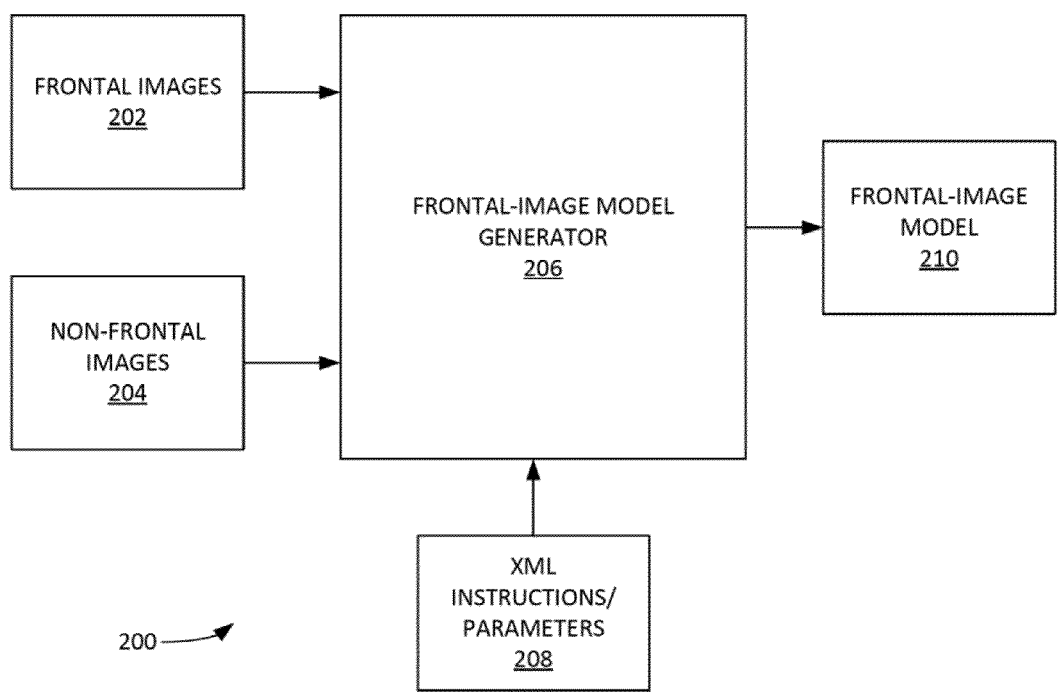
FIG. 2 illustrates an example process for generating a frontal-image model, according to some embodiments.

FIG. 2 illustrates an example process 200 for generating a frontal-image model 210, according to some embodiments. Frontal-image model 210 can be utilized for comparison with a substantially current image of a user viewing, a computing device's display. The image of the user can be obtained with a user-facing camera. Process 200 can include obtaining n-numbers (e.g. one thousand, two thousand, three thousand, etc.) image of various frontal profile images 202. These images can be obtained from a plurality of persons. Process 200 can also include obtaining n-numbers (e.g. one thousand, two thousand, three thousand, etc.) image of various Non-frontal image 204. Non-frontal image 204 can include profile images, non-human images, etc. Both frontal profile images 202 and Non-frontal image 204 can be input as a training set into a frontal-image model generator 206. As used herein, a training set can include a set of data used to discover potentially predictive relationships between a set of image (e.g. images of frontal profiles, images of Non-frontal image s, images of user eye-gaze patterns, images of user smiles and/or smile parameters, etc.). Frontal-image model generator 206 can generate one or more frontal-image model(s) 210 based on instructions/parameters 208 provided in an Extensible Markup Language (XML) and/or other markup language format.

Frontal-image model generator 206 can implement various learning algorithms, such as machine-learning algorithms, to generate frontal-image model 210. Example machine-learning, algorithms, such support vector machines (SVM), that can include statistical classification analysis algorithms, statistical regression analysis algorithms, and the like. In one example, an SVM can include a set of supervised learning models with associated learning algorithms that analyze input image data and recognize patterns, used for classification and regression analysis. The SVM can then obtain a set of input data and predicts, for each given input, which of two possible classes forms the output (e.g. as a non-probabilistic binary linear classifier). Given a set of training examples (such as those provided by XML instructions/parameters 208), each marked as belonging to one of two categories, the SVM training algorithm can build frontal-image model 210 by assigning new input image examples into one category or the other (e.g. frontal or non-frontal). An SVM model can be a representation of the examples as points in space, mapped so that the examples of the separate categories are divided by a gap that is as wide as possible. New examples are then mapped into that same space and predicted to belong to a frontal or non-frontal category based on which side of the gap they fall on. This SVM example is provided for illustration purposes only and other machine-learning algorithms can be utilized in lieu thereof according to various embodiments. In one embodiment, statistical classification analysis algorithms can be utilized to determine if an input image is a frontal image or a non-frontal image. Other examples of machine-learning algorithms that can be utilized herein include, inter alia, logistical regression algorithms (e.g. regression analysis used for predicting the outcome of a categorical dependent variable) and Gaussian mixture (e.g. a probabilistic model for representing the presence of subpopulations within an overall population) models.

Thus, in one example, n-number frontal images 202 and n-number non-frontal images 204 are input into frontal-image model generator 206. During a learning phase, frontal-image model generator 206 can determine an image descriptor. An image descriptor can include descriptions of the visual features of the contents in the images (e.g. digital images, digital videos, etc.). An image descriptor can describe the elementary characteristics such as the shape, the color, the texture or the motion, among others. A learning algorithm (such as those provided supra) can then utilize the descriptor to learn the model settings. For example, each input image can be scanned. Generated models can be utilized by computer-vision algorithms (e.g., image recognition algorithms). For example, an already learned set of model parameters can be applied over a substantially current image obtained from a user-facing digital camera), such as an algorithm that can recognize a frontal image (and/or a profile image, a smile value, a human gaze tracking, etc.).

Several examples of computer vision algorithms are now provided. A Histogram of Oriented Gradients (HOG) algorithm can be applied to the digital image. A HOG can include feature descriptors used in computer vision and/or image processing for the purpose of object detection. For example, a digital image can be obtained. The digital image can be normalized. A gray version of the digital image (e.g. a gray scale version) can be generated. The digital images gradient features can be determined. A histogram of the gradient can be determined. Features depicted in the digital image can then be determined. These features can be provided as part of the learned model (e.g. frontal-image model 210).

In another example, a Viola-Jones object detection framework can be utilized as a computer-vision algorithm. For example, a Viola-Jones facial detection algorithm (e.g. such as that implemented in OpenCV as cvHaarDetectObjects( )) can be utilized to generate a model frontal-image model for detecting when a human face is facing a computer display with a user-facing camera. These computer-vision algorithms are provided by way of explanation and not limitation. These computer-vision algorithms can be incorporated into broader computer-vision algorithm processes utilized by frontal-image model generator 206.

It is noted that system 200 can be modified to generate other types of models such as user profile models, smile models, gaze models, etc. Additionally, in some embodiments, pre-generated models can be from third panics and used in lieu of the models generated by process 200 and/or any modifications thereto.

Figure 3:
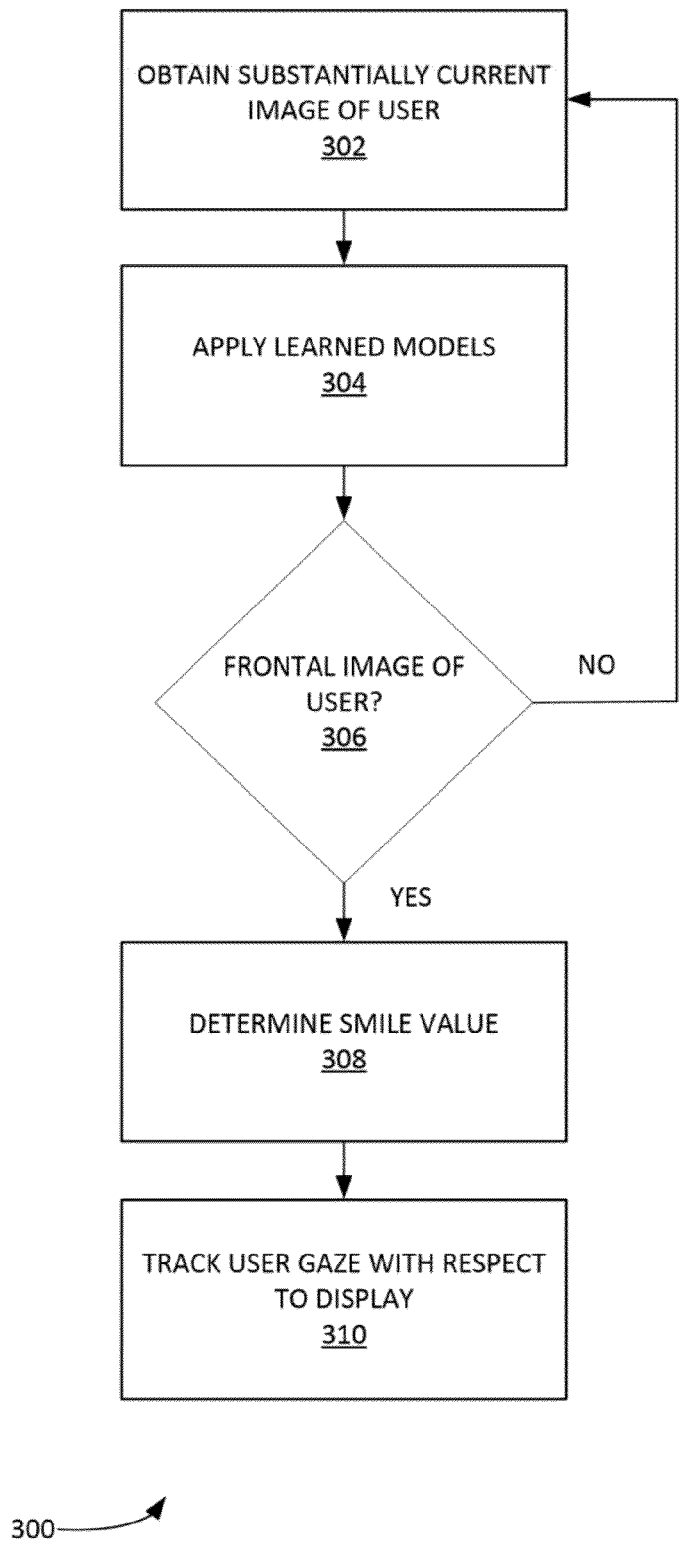
FIG. 3 illustrates an example process of analyzing user engagement and sentiment with respect to display content, according to some embodiments.

FIG. 3 illustrates an example process 300 of analyzing user engagement and sentiment with respect to display content, according to some embodiments. In step 302, a substantially current digital image of a user is obtained. The digital image can be obtained from a user-facing digital camera. In step 304, learned models are applied to the image obtained in step 302. In process 300, various learned models can include comparing the image obtained in step 302 with a frontal-image model 210, with a learned model of a user gaze, with a learning model of a non-frontal image (e.g. a profile model) and/or with one or more other learned models discussed herein. Step 304 can include image recognition algorithms utilizing learned models. In step 306, it is determined (e.g. from the output of step 304) whether the image obtained in step 302 is a frontal image of a user. If the image obtained in step 302 is not a frontal image of a user then process 300 can return to step 302, if the image obtained in step 302 is not a frontal image of a user then process 300 can proceed to step 308. In step 308, the learned models for smile values can be utilized. For example, a serious of learned models for human smiles at various positions can be generated. The image obtained in step 302 can be parsed and a block of the image including the user's smile obtained. This block can be compared with the learned models and a matched with at least one learned model of a smile. The learned model of the smile can include a score that is assigned to the image obtained in step 302. A smile score can be associated with a particular user sentiment (e.g. frowning with displeasure, smiles above a certain score with enjoyment, etc.). In step 310, user gaze can be tracked with respect to the display (e.g. a tablet touch-screen display or other computer display). For example, the display can be divided in to regions (e.g. nine substantially equal rectangular segments). A user gaze with respect to the display can be obtained. The gaze information can be used to determine which region of the display the user is observing at a particular time. The data associated with any step of process 300 can be timestamped for later correlation. Information obtained from process 300 can be provided to other analytical applications to determined, user engagement and/or sentiment (e.g. applications in a smart phone, server-side applications etc.). Information obtained from process 300 can be provided to computing device's operating system as a human-computer interaction (HCI) in order to initiate various operations (e.g. pause a video when a user 'looks away', increase touchscreen brightness, dim the screen, activate password lock when 'look away' detected-request user passkey when frontal-image of user face returns, and the like).

Figure 4:
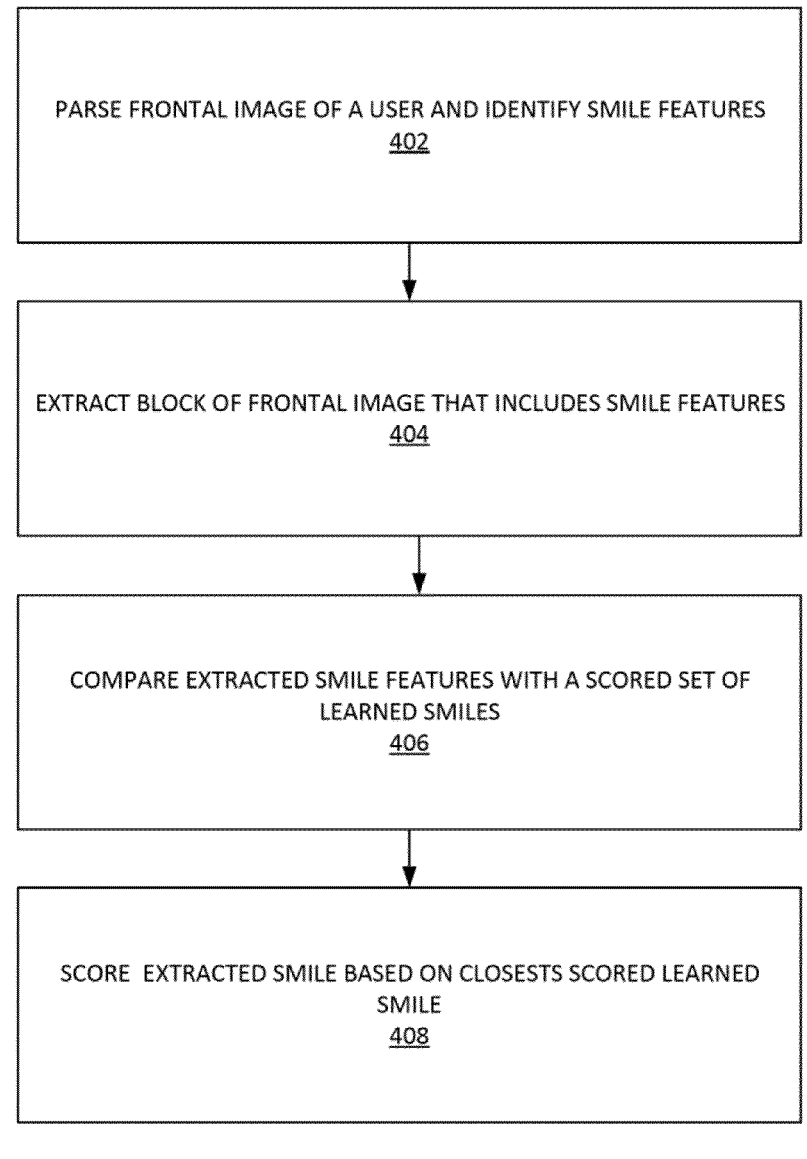
FIG. 4 illustrates a process for determining a scoring a user's smile, according to some embodiments.

FIG. 4 illustrates a process 400 for determining a scoring a user's smile, according to some embodiments. In step 402, a frontal image of a user's face is parsed and the user's smile features are identified. In step 404, a block of the image that includes the smile features is extracted. In step 406, the extracted smile features are compared with a scored set of learned smile models. For example, learned models with a higher degree of flexing muscles throughout the mouth can be scored higher based on detected degree of muscle flexion and corresponding magnitude of smile. In step 408, the extracted smile is then scored based on the closest scored learned smile.

Figure 5:
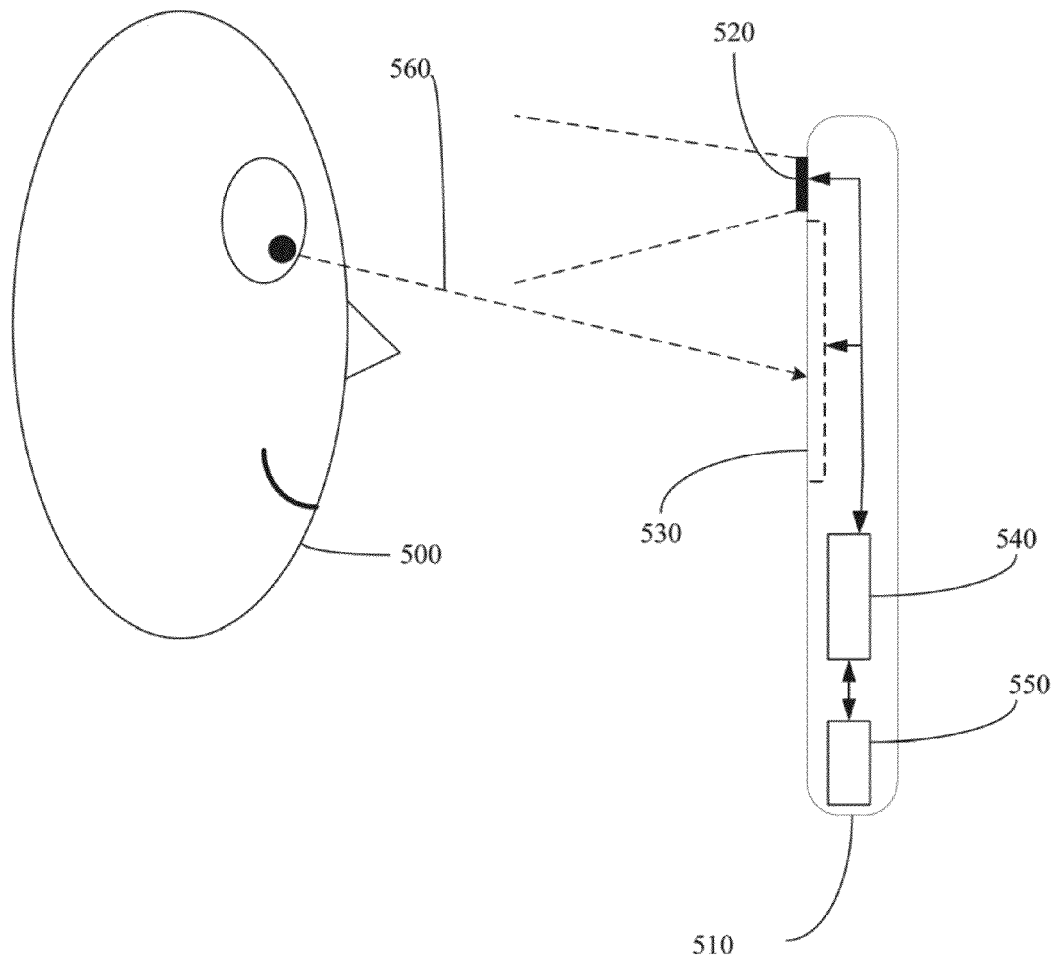
FIG. 5 illustrates one example of obtaining eye-tracking data from a user who is viewing, a digital document, according to some embodiments.

FIG. 5 illustrates one example of obtaining eye-tracking, data from a user who is viewing a digital document, according to some embodiments. In this embodiment, eye-tracking module 540 of user device 510 tracks the gaze 560 of user 500. Although illustrated here as a generic user computing device 510, the computing device 510 can be a cellular telephone, personal digital assistant, tablet computer (such as an iPad®), laptop computer, desktop computer, or the like. Eye-tracking module 540 can utilize information from at least one digital camera 520 and/or an accelerometer 550 (or similar device that provides positional information of user device 510) to track the user's gaze 560. Eye-tracking, module 540 can map eye-tracking data to information presented on display 530. For example, coordinates of display information can be obtained from a graphical user interface (GUI) operating, in computing device 510. Various eye-tracking algorithms and methodologies (such as those described herein) can be utilized to implement the example shown in FIG. 5.

In some embodiments, eye-tracking module 540 can utilize an eye-tracking method to acquire the eye movement pattern. In one embodiment, an example eye-tracking method can include an analytical gaze estimation algorithm that employs the estimation of the visual direction directly from selected eye features such as irises, eye corners, eyelids, or the like to compute a gaze 560 direction. If the positions of any two points of the nodal point, the fovea, the eyeball center or the pupil center can be estimated, the visual direction can be determined. Moreover, the eyeball center can be estimated from other viewable facial features indirectly in one embodiment, the method can model an eyeball as a sphere and hold the distances from the eyeball center to the two eye corners to be a known constant. For example, the distance can be fixed to thirteen (13) mm. The eye corners can be located and used to determine the eyeball center. In one exemplary embodiment, the iris boundaries can be modeled as circles in the image using a Hough transformation. The center of the circular iris boundary can then be used as the pupil center. In other embodiments, a high-resolution camera and other image processing tools can be used to detect the pupil. It should be noted that, in some embodiments, eye-tracking module 540 can utilize one or more eye-tracking methods in combination. Other exemplary eye-tracking methods include: a 2D eye-tracking algorithm using a single camera and Purkinje image, a real-time eye-tracking algorithm with head movement compensation, a real-time implementation of a method to estimate gaze 560 direction using stereo vision, a free head motion remote eyes (REGT) technique, or the like. Additionally, any combination of any of these methods can be used. It is noted that other eye-tracking methodologies can be utilized in lieu of those provided supra.

It is noted that eye-tracking data can be obtained substantially simultaneously and matched with a region (e.g. segment, section) of display 530. The region of 510 can be matched with a media content element displayed in the region. In this way, a user's eye-tracking data that relates to a media content element can be obtained. The eye-tracking data can be timestamped. The eye-tracking data and time stamps can be used to determine a user's attention span for a period of time.

Exemplary Architecture and Computing Environments

Figure 6:
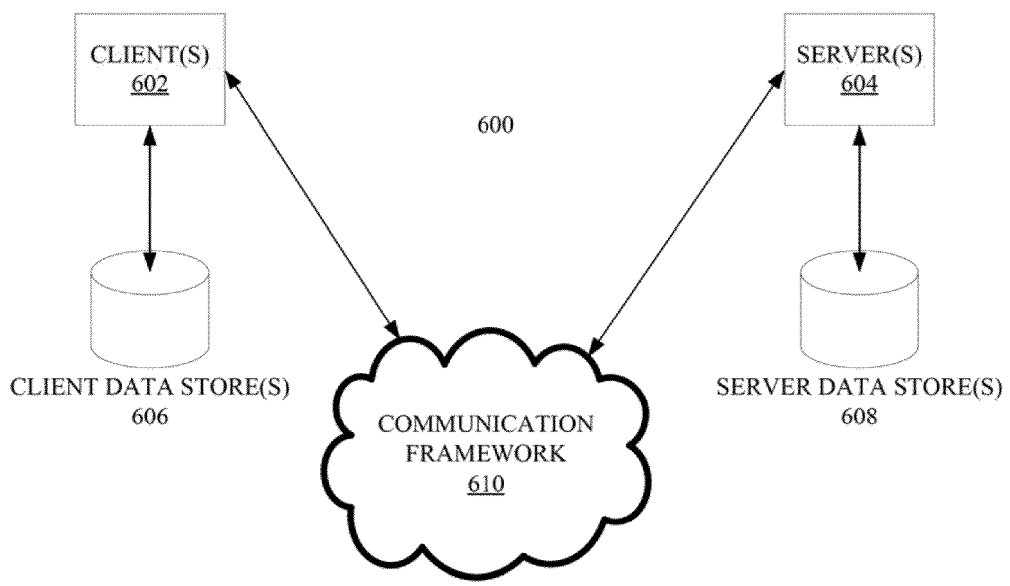
FIG. 6 illustrates a sample computing environment which can be utilized in some embodiments.

FIG. 6 illustrates a sample computing environment 600 which can be utilized in some embodiments. The system 600 further illustrates a system that includes one or more client(s) 602. The client(s) 602 can be hardware and/or software (e.g., threads, processes, computing devices). The system 600 also includes one or more server(s) 604. The server(s) 604 can also be hardware and/or software (e.g., threads, processes, computing devices). One possible communication between a client 602 and a server 604 may be in the form of a data packet adapted to be transmitted between two or more computer processes. The system 600 includes a communication framework 610 that can be employed to facilitate communications between the client(s) 602 and the server(s) 604. The client(s) 602 are connected to one or more client data store(s) 1006 that can be employed to store information local to the client(s) 602. Similarly, the server(s) 604 are connected to one or more server data store(s) 608 that can be employed to store information local to the server(s) 604.

Figure 7:
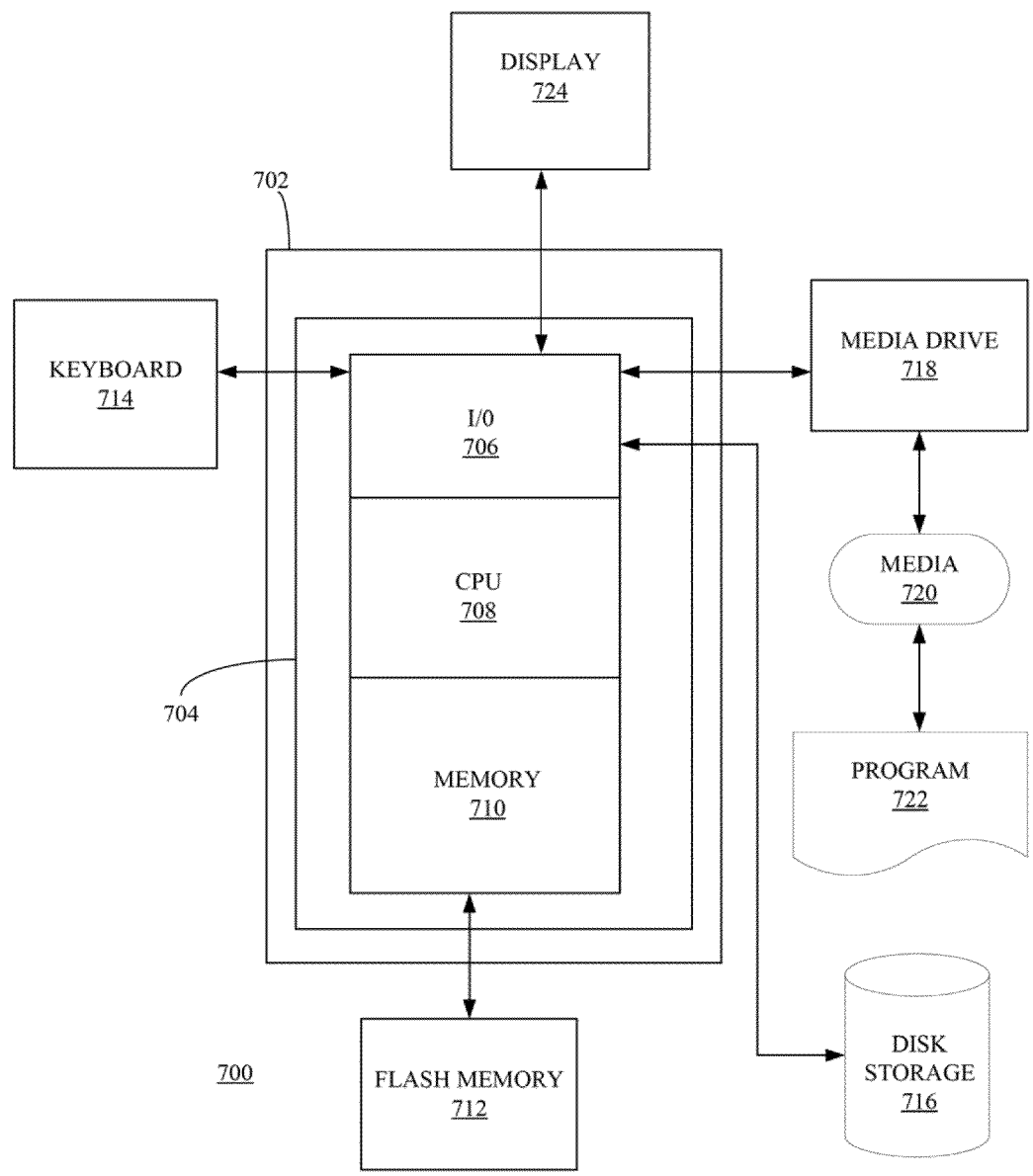
FIG. 7 depicts an exemplary computing system that can be configured to perform any one of the above-described processes.

FIG. 7 depicts an exemplary computing system 700 that can be configured to perform any one of the above-described processes. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or sonic combination thereof.

FIG. 7 depicts computing system 700 with a number of components that may be used to perform the above-described processes. The main system 702 includes a motherboard 704 having an I/O section 706, one or more central processing units (CPU) 708, and a memory section 710, which may have a flash memory card 712 related to it. The I/O section 706 is connected to a display 724, a keyboard 714, a disk storage unit 716, and a media drive unit 718. The media drive unit 718 can read/write a computer-readable medium 720, which can contain programs 722 and/or data. System 700 can include a user-facing camera (not shown).

Figure 8:
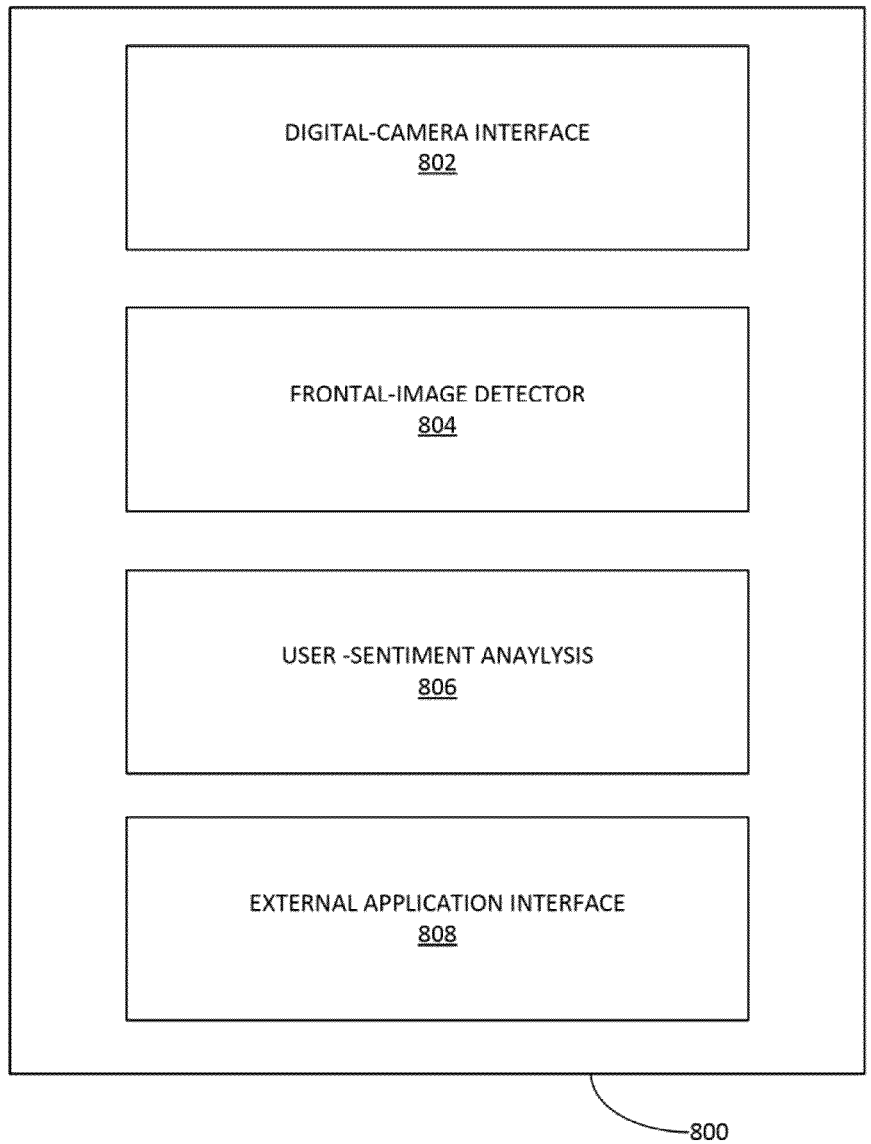
FIG. 8 illustrates an example system for determining user engagement and sentiment with learned models and user-facing camera images, according to some embodiments.

FIG. 8 a system 800 (e.g. a client-side application) for determining user engagement and sentiment with learned models and user-facing camera images, according to some embodiments. System 800 can include digital-camera interface 802. Digital-camera interface 802 can obtain digital images from a user-facing digital camera of a computing device in which system 800 operates. Frontal-image detector 804 can analyze the digital images to determine if a user is viewing a display of the computing device. For example, Frontal-image detector 804 can implement computer-vision algorithms to detect a frontal-view of a user's face (e.g. a frontal-image). If a frontal-view of a user's face is detected, then various attributes of the user's face can be obtained/tracked. For example, the user's gaze can be tracked with respect to locations on the display. The user's gaze can be mapped with displayed content. In this way, for example, it can be determined that a user is engaged with a particular digital video and/or digital image. Frontal-image detector 804 can also detected non-frontal images (e.g. user-profile images). Accordingly, frontal-image detector 804 can then determine a 'look away' has occurred if a frontal-image detection is followed by a profile detection. User-sentiment analysis can include a module for determining a user's sentiment can while the user is viewing the display. For example, User-sentiment analysis can parse the digital image(s) of the user and identify blocks of the image that include smile attributes. User-sentiment analysis can then extract the blocks. User-sentiment analysis can score the user's smile attributes (e.g. based on smile characteristics when compared with a set of smile models). Smile scores can be aggregated with other sentiment indicators extracted from the digital image. In this way, a user's sentiment while viewing the display can be scored as well. Information from frontal-image detector 804 and user-sentiment analysis can be provided to external application interface 808. External application interface 808 can provide user engagement and sentiment information (as well as other relevant metadata such as information about display content, time stamps and the like) an external analytics module.

Example use Cases

Figure 9:
FIG. 9 illustrates an example frontal image of a user obtained by a user-facing camera of a computing, according to some embodiments.

FIG. 9 illustrates an example frontal image 900 of a user obtained by a user-facing camera of a computing, according to some embodiments. One or more computer vision algorithms (e.g. as provided supra), can be utilized to determine that frontal image 900 comprises a frontal image of a user substantially contemporaneously facing the computing device. For example, a comparison algorithm can be utilized to compare frontal image 900 with one or more learned-models of frontal images. Frontal image 900 can be extracted from a larger image to remove extraneous image data not related to determining, whether frontal image 900 includes the frontal image of the user. For example, if frontal image 900 is detected in decision step 306 of process 300, then process 300 can proceed to step 308. In another example, when frontal image 900 is succeeded by a detection of profile image 1200 (see FIG. 12 infra), then a 'look away' event, can be detected and subsequent operating system functions (e.g. pausing a video being played by the computing device) can be implemented.

Figure 10:
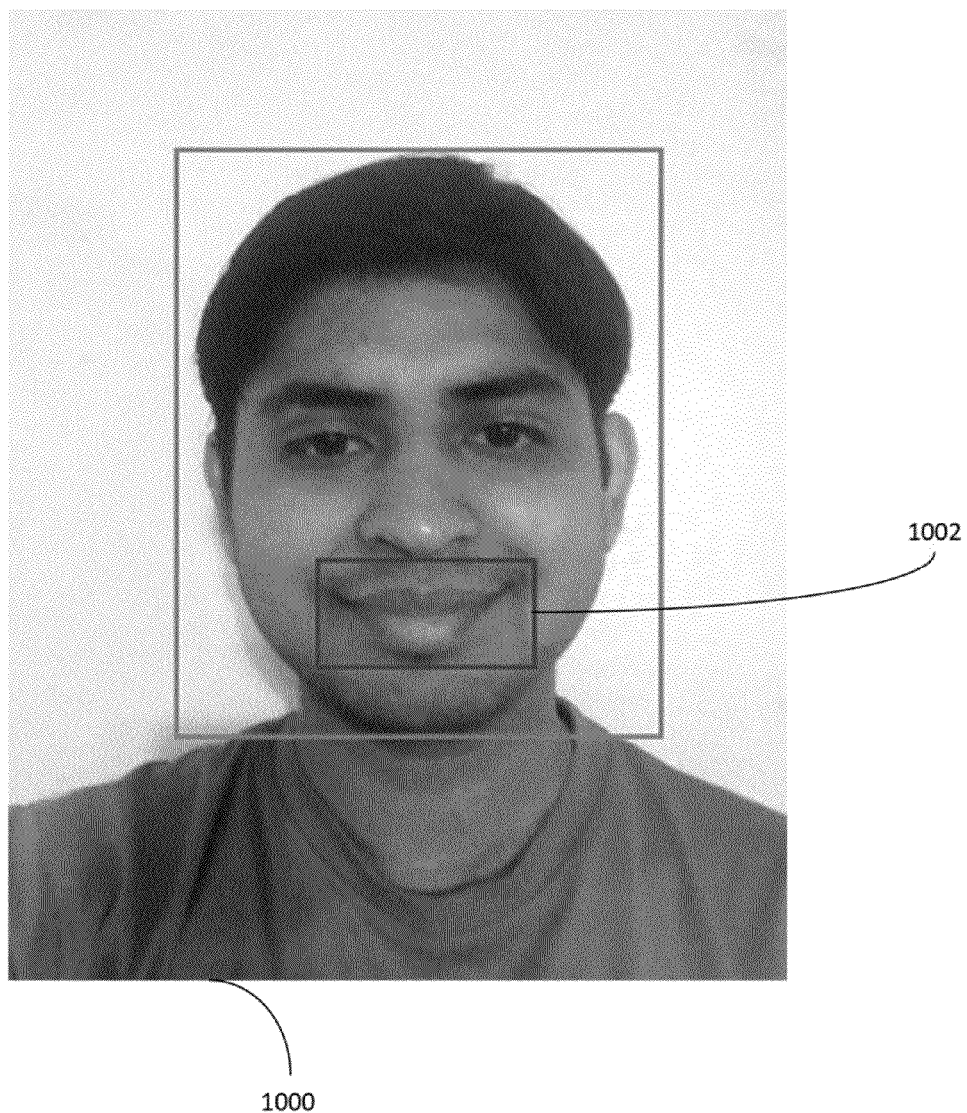
FIGS. 10 and 11 illustrate examples of frontal images 1000 and 1100 of a user obtained by a user-facing camera of a computing device, according to some embodiments.
Figure 11:
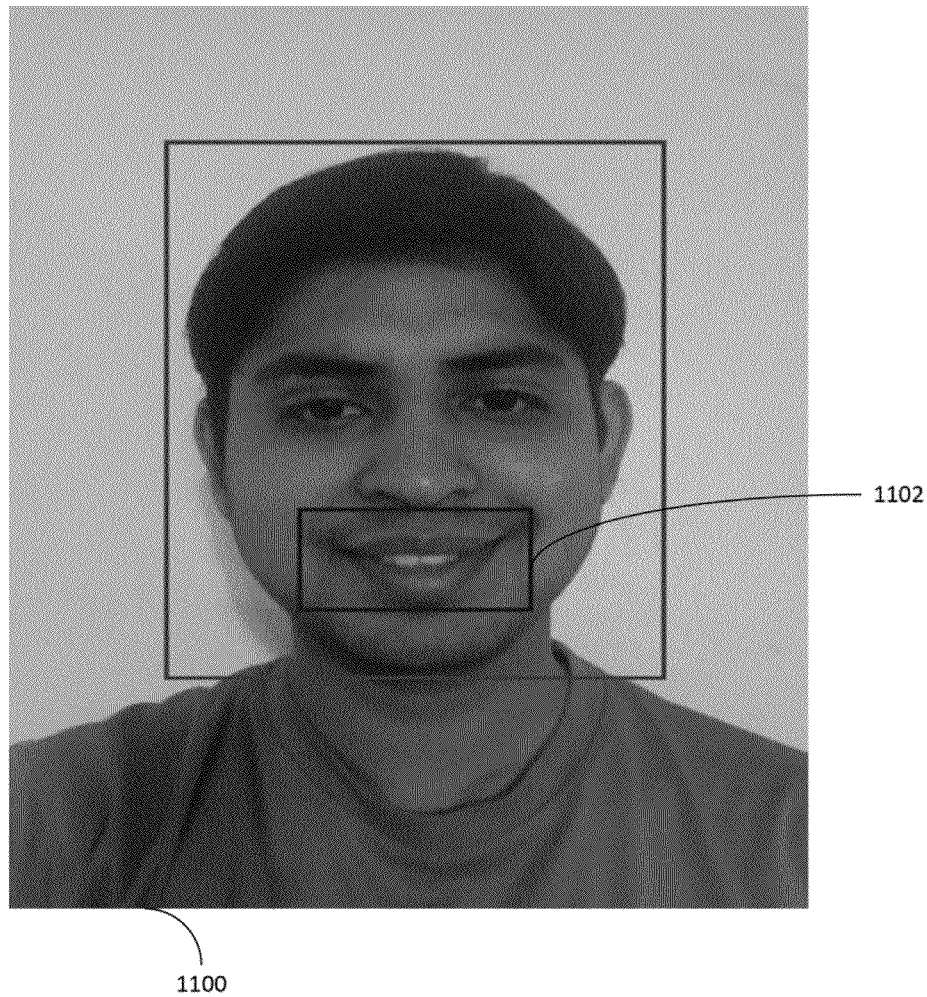

FIGS. 10 and 11 illustrate examples of frontal images 1000 and 1100 of a user obtained by a user-facing camera of a computing device, according to some embodiments. Frontal images 1000 and 1100 can include user-smile attributes 1002 and 1102. User-smile attributes 1002 and 1102 can be compared with a set of learned user-smile attributes and different user-sentiment scores can be determined accordingly. User-sentiment scores can be based on the magnitude of various measured user-smile attributes provided in frontal images 1000 and 1100. For example, user-smile attributes 1102 can be matched with a learned, user-smile model with a higher score than another learned user-smile model, matched with user-smile attributes 1002. In this way, the user depicted frontal images 1000 can be determined to a user-sentiment score that is different than the user depicted frontal images 1100. User-sentiment scores can be match with media content substantially contemporaneously display when the respective user depicted frontal image was obtained. In the case where frontal images 1000 and 1100 depict the same user in a sequential manner, than the change in the user's sentiment score can be noted as well.

Figure 12:
FIG. 12 illustrates an example non-frontal image of a user obtained by a user-facing camera of a computing, according to some embodiments.

FIG. 12 illustrates an example non-frontal image 1200 of a user obtained by a user-facing camera of a computing, according to some embodiments. Non-frontal image 1200 can be a profile image. In one example, when a frontal image (e.g. frontal image 900) is not detected, one or more computer-vision algorithms can be implemented (e.g. with a learned model of a profile image) to identify a class of non-frontal image 1200. As noted supra, changes between non-frontal image 1200 and frontal image 900 can be utilized as a form of HCI. In addition to the 'look away' to pause operation described supra, a change from a detected non-frontal image 1200 to frontal image 900 can be utilized to imitate a 'resume playing a paused video' operation, a 'increase light intensity of the display' operation, and the like.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system) and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method comprising:
    obtaining a digital image of a user with a user-facing camera of a computing device;
    determining that the digital image comprises a frontal image of the user;
    calculating a user-sentiment score based on at least one attribute of the frontal image;
    determining a user engagement value with respect to a portion of a display of the computing device;
    communicating at least one of the frontal image of the user, the user-sentiment score or the gaze position of the user to an external server process or an application operating in the computing device;
    wherein the step of determining that the digital image comprises a frontal image of the user further comprises:
        receiving a frontal-image learned model; and
        comparing the digital image with the frontal-image learned model;
    wherein the step of determining that the digital image comprises a frontal image of the user further comprises:
        determining a sufficient similarity between the digital image and the frontal-image learned model;
    wherein the step of calculating a user-sentiment score based at least one attribute of the frontal image further comprises:
        receiving a set of learned-smile models, wherein each learned-smile model is associated with a specified user-sentiment score; and
        extracting a user-smile attribute from the frontal-image;
    wherein the step of calculating a user-sentiment score based on at least one attribute of the frontal image further comprises:
        comparing the user-smile attribute with the set of learned-smile models;
        determining a best-fit learned-smile model of the set of learned-smile models for the user-smile attribute; and
        assigning the user sentiment score the specified user-sentiment score of the best-fit learned-smile model; and
    wherein the step of determining a user engagement value with respect to a portion of a display of the computing device further comprises:
        mapping a gaze position of the user with respect to a location of the display of the computing device.

2. The method of claim 1, wherein the computing device comprises a tablet computer.

3. The method of claim 1 further comprising:
    detecting that a subsequent digital image comprises a profile image of the user after a previous digital image comprises the frontal image of the user.

4. The method of claim 3, wherein the form of human-computer interaction comprises:
    pausing a play process of a digital video.

5. A computer system comprising:
    a processor configured to execute instructions;
    a memory containing instructions when executed on the processor, causes the processor to perform operations that:
        obtain a digital image of a user with a user-facing camera of a computing device, and wherein the computing device comprises a tablet computer;
        determine that the digital image comprises a frontal image of the user;
        calculate a user-sentiment score based on at least one attribute of the frontal image, and wherein the operation to calculate a user-sentiment score based on at least one attribute of the frontal image further comprises;
            receive a set of learned-smile models, wherein each learned-smile model is associated with a specified user-sentiment score, and
        extract a user-smile attribute from the frontal-image
        determine a user engagement value with respect to a portion of a display of the computing device, and wherein the operation to determine that the digital image comprises a frontal image of the user further comprises:
receive a frontal-image learned model;
compare the digital image with the frontal-image learned model; and
determine a sufficient similarity between the digital image and the frontal-image learned model; and
communicate at least one of the frontal image of the user, the user-sentiment score or the gaze position of the user to an external server process or an application operating in the computing device.

6. The computer system of claim 5, wherein the operation to calculate a user-sentiment score based on at least one attribute of the frontal image further comprises;
compare the user-smile attribute with the set of learned-smile models;
determine a best-fit learned-smile model of the set of learned-smile models for the user-smile attribute; and
assign the user sentiment score the specified user-sentiment score of the best-fit learned-smile model.

7. The computer system of claim 5, wherein the operation to determine a user engagement value with respect to a portion of a display of the computing device further comprises:
map a gaze position of the user with respect to a location of the display of the computing device.

8. The computer system of claim 5 further comprising:
detect that a subsequent digital image comprises a profile image of the user after a previous digital image comprises the frontal image of the user.

9. The computer system of claim 8, wherein the form of human-computer interaction comprises:
pausing a play process of a digital video.

10. A method comprising:
obtaining, with at least one processor, a digital image of a user with a user-facing camera of a computing device;
determining that the digital image comprises a frontal image of the user;
calculating a user-sentiment score based on at least one attribute of the frontal image;
determining a user engagement value with respect to a portion of a display of the computing device;
communicating at least one of the frontal image of the user, the user-sentiment score or the gaze position of the user to an external server process or an application operating in the computing device;
wherein the step of determining that the digital image comprises a frontal image of the user further comprises:
receiving a frontal-image learned model; and
comparing the digital image with the frontal-image learned model;
wherein the step of determining that the digital image comprises a frontal image of the user further comprises:
determining a sufficient similarity between the digital image and the frontal-image learned model;
wherein the step of calculating a user-sentiment score based on at least one attribute of the frontal image further comprises:
receiving a set of learned-user-sentiment models, wherein each learned-smile model is associated with a specified user-sentiment score; and
extracting a user-sentiment attribute from the frontal-image;
wherein the step of calculating a user-sentiment score based on at least one attribute of the frontal image further comprises:
comparing the user-sentiment attribute with the set of learned-user-sentiment models;
determining a best-fit learned-user-sentiment model of the set of learned-user-sentiment models for the user-sentiment attribute; and
assigning the user sentiment score the specified user-sentiment score of the best-fit learned-user-sentiment model; and
wherein the step of determining a user engagement value with respect to a portion of a display of the computing device further comprises:
mapping a gaze position of the user with respect to a location of the display of the computing device.

* * * * *